United States Patent [19]

Stark

[11] Patent Number: 5,674,009
[45] Date of Patent: Oct. 7, 1997

[54] ADJUSTABLE LENGTH TEMPERATURE SENSOR

[75] Inventor: Stephen T. Stark, Tulsa, Okla.

[73] Assignee: Weed Instrument Company, Inc., Round Rock, Tex.

[21] Appl. No.: 433,035

[22] Filed: May 3, 1995

[51] Int. Cl.⁶ ................................................ G01K 1/08
[52] U.S. Cl. .................................... 374/209; 136/230
[58] Field of Search .............................. 374/208, 209; 136/230, 232, 233, 221; 206/305, 306, 719

[56] References Cited

U.S. PATENT DOCUMENTS

| | | | |
|---|---|---|---|
| 3,589,192 | 6/1971 | Sabovik | 73/344 |
| 3,679,490 | 7/1972 | Finkbiner | 136/221 |
| 3,751,305 | 8/1973 | Huebscher | 136/221 |
| 3,880,282 | 4/1975 | Naumann | 374/209 |
| 3,930,892 | 1/1976 | Fox et al. | 136/217 |
| 4,137,768 | 2/1979 | Tushie et al. | 73/343 R |
| 4,453,835 | 6/1984 | Clawson et al. | 374/208 |
| 4,483,630 | 11/1984 | Varela | 374/119 |
| 4,527,909 | 7/1985 | Dale et al. | 136/230 |
| 4,590,669 | 5/1986 | Imamura | 374/208 |
| 4,826,540 | 5/1989 | Mele | 136/221 |
| 4,963,194 | 10/1990 | Mele | 136/221 |
| 5,161,894 | 11/1992 | Bourigault | 374/208 |

*Primary Examiner*—William Dowling
*Attorney, Agent, or Firm*—Russell D. Culbertson; Shaffer & Culbertson

[57] ABSTRACT

A temperature sensor sheath (12) includes at least one stress concentrating structure (30) and preferably a plurality of such structures spaced apart along the length of the sheath (12). Each stress concentrating structure (30) produces a severe stress riser when the sheath (12) is subjected to a bending moment and allows the sheath (12) to be broken easily by applying a bending force back and forth. The stress concentrating structures (30) each preferably comprise a groove (32) formed or cut into the sheath material around the perimeter of the sheath (12).

14 Claims, 2 Drawing Sheets

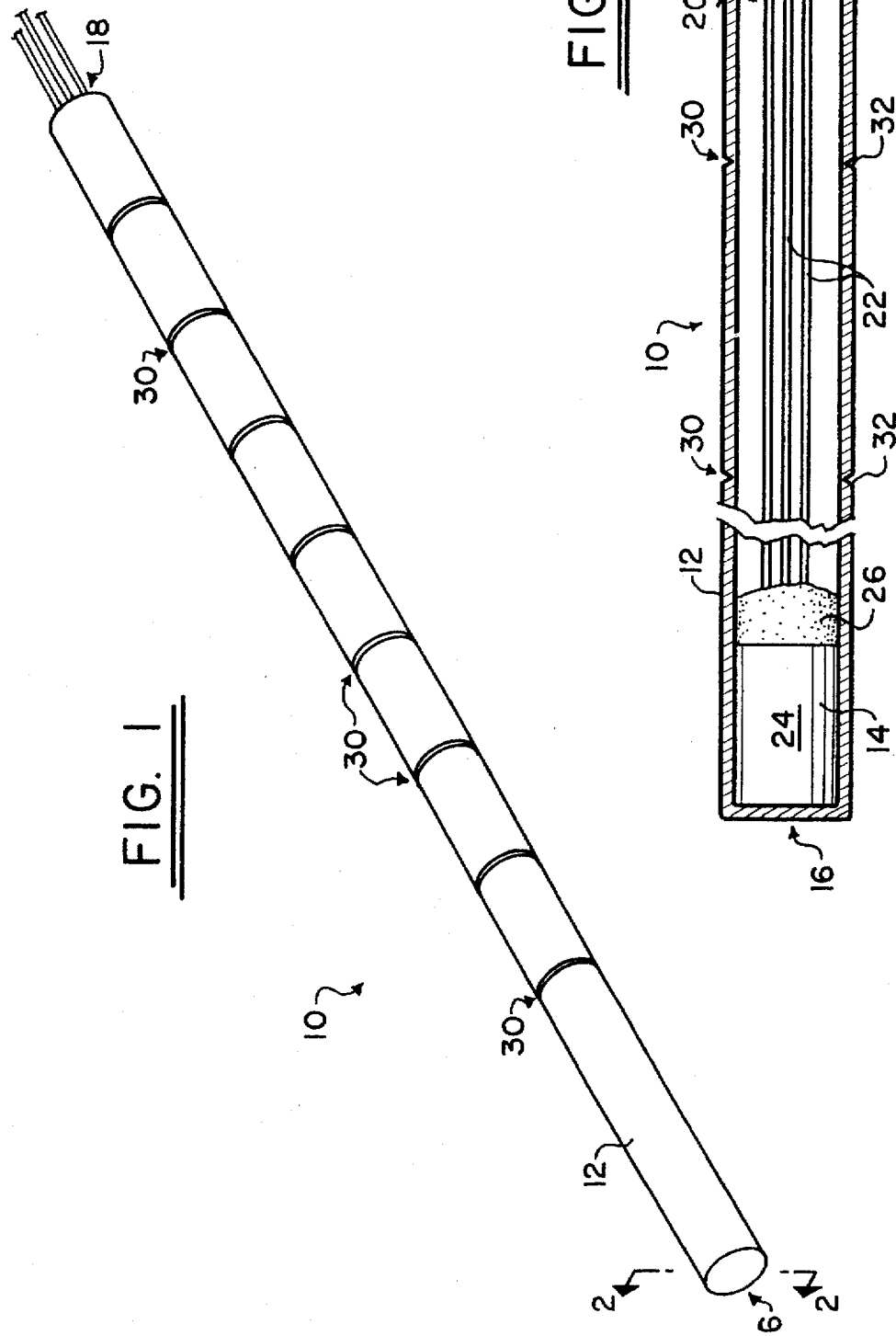

ADJUSTABLE LENGTH TEMPERATURE SENSOR

BACKGROUND OF THE INVENTION

This invention relates to temperature sensors and particularly to a temperature sensor that can be shortened easily without affecting the sensor operation or usefulness.

Temperature sensor probes, referred to in this document sometimes simply as sensors, are required for many industrial and other applications. Commonly, a temperature sensor comprises a sensing element housed in an elongated sheath. The sensing element itself may be an electrical resistive element, for example. The sensor is commonly installed in a thermowell to position the sensor element at a location at which the temperature reading is desired. The thermowell is a structure mounted on a vessel, pipe, or other container in which temperatures are to be sensed. The thermowell includes a housing extending into the vessel, pipe, or other container to the desired depth, and the sensor may be inserted into the housing and fixed in position by a suitable arrangement.

The depth into the vessel or a pipe at which a temperature reading is desired changes substantially from application to application. For small diameter pipes, for example, the thermowell and sensor need only extend a short distance, whereas for larger diameter pipes and large vessels, the thermowell and sensor must extend a substantially longer distance to provide the desired temperature reading. Thus, temperature sensors must be available in a variety of sheath lengths.

It is possible to simply produce many different sensors having different sheath lengths, each sensor designed for a particular application. However, producing many different sensors is costly and increases inventory costs for the manufacturer and also for the user. Another solution is to have a sensor with a sheath that may be cut to a desired length. However, cutting the sheath with a tube cutter or a saw invariably creates sharp edges extending inwardly at the cut end of the sheath. The sharp edges that remain in the sheath can cut the leads extending to the sensor element housed within the sheath and render the sensor inoperative. Also, cutting the sheath requires a cutting tool, which may not always be readily available to the sensor installer.

SUMMARY OF THE INVENTION

It is therefore a general object of the invention to provide a temperature sensor that overcomes these and other problems associated with prior temperature sensors. Particularly, it is an object of the invention to provide a temperature sensor that may be shortened to a desired length without affecting the performance of the sensor.

In order to accomplish these objects, a temperature sensor according to the invention includes a sheath having a series of stress concentrating structures or means formed at different positions along the length of the sheath. A preferred stress concentrating structure comprises a groove cut out or otherwise formed into the sheath material, leaving a relatively thin section of material. The groove creates a severe stress riser when the sheath is subjected to a bending moment. In order to shorten the sheath to the desired length, the installer need only choose the groove at which the sheath is to be shortened and apply a bending force back and forth at that groove. The stress in the thin section of material at the groove quickly causes the material to break, leaving the sheath at the desired length.

The break-to-length temperature sensor according to the invention has several advantages over prior sensors. First, the sensor requires no tools to shorten the sheath to the desired length and is therefore very convenient for installers. Most importantly, the breakable structure according to the invention leaves no sharp edges extending inwardly into the sheath which could cut sensor element leads. Thus, the sheath according to the invention may be shortened easily without affecting the operability of the sensor.

These and other objects, advantages, and features of the invention will be apparent from the following description of the preferred embodiments, considered along with the accompanying drawings.

BRIEF DESCRIPTION OF THE DRAWINGS

FIG. 1 is a view in perspective of a temperature sensor embodying the principles of the invention.

FIG. 2 is a view in partial section taken along line 2—2 in FIG. 1.

DESCRIPTION OF THE PREFERRED EMBODIMENTS

Figure 3:
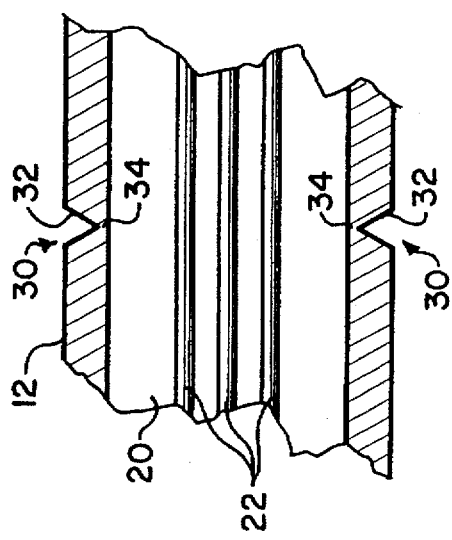
FIG. 3 is an enlarged view in section of the sheath shown in FIG. 2, showing one of the grooves formed in the sheath.

FIGS. 1 through 3 illustrate one preferred form of a temperature sensor 10 embodying the principles of the invention. Referring to FIGS. 1 and 2, the sensor 10 includes an elongated sheath 12 and a temperature sensor element 14 mounted within the sheath.

The sheath 12 may be formed from any suitable material, such as stainless steel. The shape of the sheath 12 is shown as being cylindrical in this form of the invention. However, the cross-sectional shape need not be round and may be any shape required to suit a particular application. The sheath 12 has a closed distal end 16 and an open proximal end 18, with an opening 20 extending the entire length between the distal and proximal ends. The opening 20 extending the length of the sheath 12 accommodates the sensor element 14 and the leads 22 extending to the sensor element.

Alternatively to the unitary, single material sheath shown in FIGS. 1 and 2, the sheath 12 may be made in two parts with a stainless steel end section housing the temperature sensor element 14, and the rest of the sheath 12 comprising any other suitable material joined to the end section by any suitable means. In some applications it may be advantageous to make the bulk of the sheath, particularly the proximal end, from a non-metallic, non-electrically conductive material such as fiberglass or a suitable plastic.

The illustrated sensor element 14 comprises a resistance temperature sensing device or RTD which provides an indication of temperature based upon the electrical resistance of a conductor (not shown) positioned within a housing 24 of the sensor element. Although the RTD-type sensor element 14 is shown for purposes of example in this disclosure, those skilled in the art will readily appreciate that the sensor element may be any type of temperature sensing device.

In this form of the invention, the temperature sensor element 14 is potted or sealed permanently in the distal end 16 of the sensor sheath 12. The sealing material 26 may be a suitable epoxy or any other suitable potting or sealing material. The sensor leads 22 extend through the potting and sealing material 26 and the length of the sheath 12 and are exposed out of the opening at the proximal end 18 of the sensor sheath. The drawings show three leads, which is the common number for RTD-type sensor elements. More or fewer leads may be required for other types of sensor elements. Also, the sensor element 14 need not be potted in the sheath 12 and may be simply inserted and held in position by crimping the sheath on the leads behind the sensor or by a suitable fitting (not shown).

As shown in all of the figures, the sensor sheath 12 includes a plurality of stress concentrating structures or means 30 spaced apart along the length of the sheath. Referring to FIG. 3, which shows a single stress concentrating structure 30 on an enlarged scale, each of the stress concentrating structures preferably comprises a groove 32 formed in the sheath material, leaving a relatively narrow or thin section of material 34 as compared with the adjacent sheath material. The relatively narrow section of material 34 is subjected to high stress when the sheath 12 is subjected to a bending moment. This high stress causes the material to fail and break at the thin section 34 after applying a bending moment back and forth several times. After the material breaks, the excess section of sheath may simply be removed and discarded, leaving the shortened sheath. The sheath 12 may be shortened to a desired length by choosing the particular groove or stress concentrating structure at or near the length desired for the particular application and then breaking the sheath at that point and discarding the excess sheath material.

As shown in FIG. 3, the groove 32 is preferably formed on the outside surface of the sheath 12. In other forms of the invention, the groove may be formed on the inside surface of the sheath. Each groove 32 may be cut by a suitable machining process into the sheath material, or may be formed as the sheath itself is formed. The preferred groove 32 has a V-shaped cross-sectional shape, although other groove profiles may be used to produce the desired thin section of material 34. For purposes of example, a stainless steel sheath 12 may have an outside diameter of approximately 0.25 inches and a wall thickness of approximately 0.030 inches. The groove depth may leave a wall thickness of approximately 0.020 inches at the point 34 where the groove leaves the thinnest sheath material. These dimensions in stainless steel leave the sheath 12 strong enough to withstand handling and use, but allow the sheath to be easily breakable at the stress concentrating structures 30 to adjust the length of the sheath to the desired length for a particular application.

Figure 4:
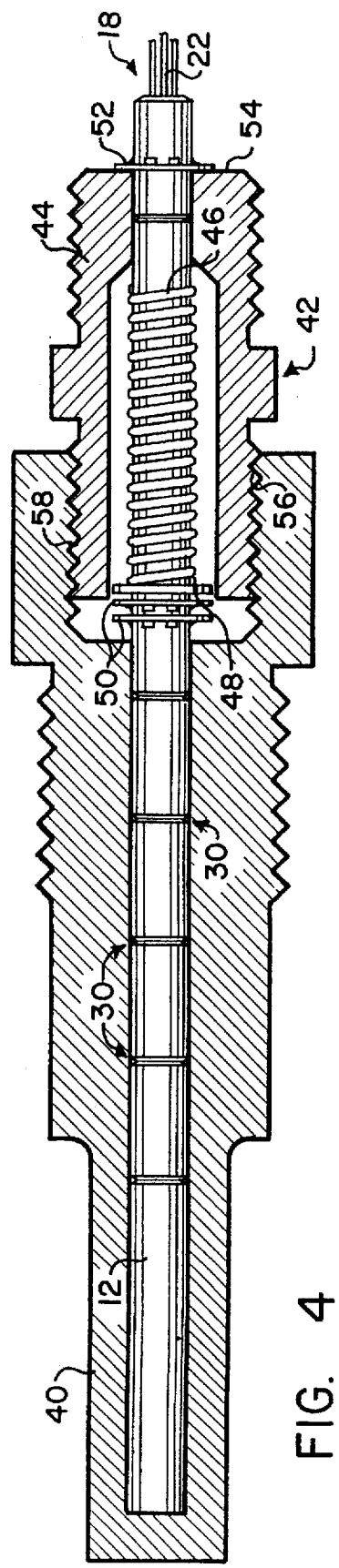
FIG. 4 is a view partially in section, showing a sensor according to the invention installed in a thermowell.

FIG. 4 shows the sensor 10 according to the invention installed in a thermowell 40. The illustrated installation is made with a spring-loaded attachment 42 including a fitting 44, a spring 46, a washer 48, and retainer rings 50. A separate retainer ring 52 may be included at an outside end 54 of the fitting 44. Retainer ring 52 holds the fitting 44 on the sheath 12 prior to assembly into the thermowell 40. The fitting 44 includes a thread 56 which corresponds to a thread 58 formed on the thermowell 40. This spring-loaded attachment 42 has the advantage of allowing the spring 46 to continually force the temperature sensor 10 against the end of the thermowell 40 to produce good thermal contact between the thermowell and the end of the sensor containing the temperature sensing element 14.

To install the temperature sensor 10 of the invention with the spring load attachment 42, the sheath 12 is first broken to the desired length and the washer 48 and retainer rings 50 placed at the desired location near the proximal end 18 of the sheath. The spring 46 and then the fitting 44 are slipped over the proximal end 18 of the sheath 12, and the outside retaining ring 52 is placed over the proximal end 18 of the sheath 12 in a position abutting the outside end 54 of the fitting 44. The fitting 44 may then be threaded into the corresponding thread 58 of the thermowell to compress the spring 46 slightly.

This spring-loaded attachment is shown for purposes of example only. Any number of attachment methods may be used to attach a sensor according to the invention to a thermowell or other structure in which it is to be used. For example, a compression fitting may be used to connect the sensor to a thermowell or other structure. In some cases, a simple set screw may be used to retain a temperature sensor according to the invention in a desired position for use.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A sensor probe assembly comprising:
    (a) an elongated protective sheath;
    (b) a sensor element fixed at a distal end of the protective sheath; and
    (c) at least one stress concentrating means positioned along the length of the protective sheath.

2. The sensor probe assembly of claim 1 further including:
    (a) a plurality of stress concentrating means, each at a different longitudinal position along the length of the protective sheath.

3. The sensor probe assembly of claim 1 wherein each stress concentrating means comprises:
    (a) a groove formed around substantially the entire perimeter of the protective sheath.

4. The sensor probe assembly of claim 3 wherein the groove is formed on an outside surface of the protective sheath.

5. The sensor probe assembly of claim 3 wherein the groove is formed on an inside surface of the protective sheath.

6. The sensor probe assembly of claim 3 wherein the cross sectional shape of the groove forms substantially a V-shape.

7. The sensor probe assembly of claim 1 wherein the sheath is generally cylindrical in shape.

8. In an elongated protective sheath for a sensor probe assembly, the improvement comprising:
    (a) at least one stress concentrating means positioned along the length of the protective sheath.

9. In the elongated protective sheath of claim 8, the improvement further comprising:
    (a) a plurality of stress concentrating means, each at a different longitudinal position along the length of the protective sheath.

10. In the elongated protective sheath of claim 8, each stress concentrating means comprising:
    (a) a groove formed around substantially the entire perimeter of the protective sheath.

11. In the elongated protective sheath of claim 10, each groove being formed in an outside surface of the protective sheath.

12. In the protective sheath of claim 10, each groove being formed in an inside surface of the protective sheath.

13. In the protective sheath of claim 10, the cross sectional shape of each groove forming substantially a V-shape.

14. In the elongated protective sheath of claim 8, the sheath having a generally cylindrical shape.

* * * * *